United States Patent
Ciliox et al.

(10) Patent No.: US 6,509,654 B2
(45) Date of Patent: *Jan. 21, 2003

(54) ENERGY MANAGEMENT SYSTEM WITH ARRANGEMENT TO MONITOR AND CONTROL HEATING, VENTILATING AND AIR CONDITIONING COMPONENTS

(75) Inventors: Gunter Ciliox, Eschenburg; Markus Hain, Dillenburg; Jorg Kreiling, Biebertal; Achim Edelmann, Dillenburg-Donsbach, all of (DE)

(73) Assignee: Rittal-Werk Rudolf Loh & GmbH & Co. KG, Herborn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/142,714
(22) PCT Filed: Feb. 13, 1997
(86) PCT No.: PCT/EP97/00660
§ 371 (c)(1), (2), (4) Date: Sep. 9, 1998
(87) PCT Pub. No.: WO97/34345
PCT Pub. Date: Sep. 18, 1997

(65) Prior Publication Data
US 2002/0005667 A1 Jan. 17, 2002

(30) Foreign Application Priority Data
Mar. 13, 1996 (DE) ........................ 196 09 689

(51) Int. Cl.[7] .................................................. H02B 1/24
(52) U.S. Cl. ......................................... 307/11; 307/64
(58) Field of Search ............................ 307/11, 64–66, 307/22, 73, 116–119; 361/695, 641, 676–678, 605, 690–697, 701

(56) References Cited

U.S. PATENT DOCUMENTS 5,484,012 A * 1/1996 Hiratsuka .................... 361/695
6,222,448 B1 * 4/2001 Beck et al. .................. 340/506

FOREIGN PATENT DOCUMENTS

| DE | 28 22 938 A1 | 11/1979 |
| DE | G 81 30 103.0 | 8/1982 |
| DE | 33 26 977 A1 | 2/1985 |
| DE | G 84 33 339.1 | 5/1985 |
| DE | G 93 05 530.7 | 7/1994 |
| DE | 43 36 187 A1 | 4/1995 |
| DE | 43 36 204 A1 | 4/1995 |

* cited by examiner

Primary Examiner—Fritz Fleming
(74) Attorney, Agent, or Firm—Jansson, Shupe & Munger, Ltd.

(57) ABSTRACT

The invention relates to a control box with monitoring and control modules for statuses of built-in and/or fitted components thereof. Adaptions for various operative requirements with a comprehensible construction is achieved in that there is a central control device which can be connected via inputs and outputs to the monitoring and/or control components and by means of which the statuses of the various built-in and/or fitted components can be individually monitored, controlled and/or regulated in a predetermined or predeterminable manner.

8 Claims, 1 Drawing Sheet

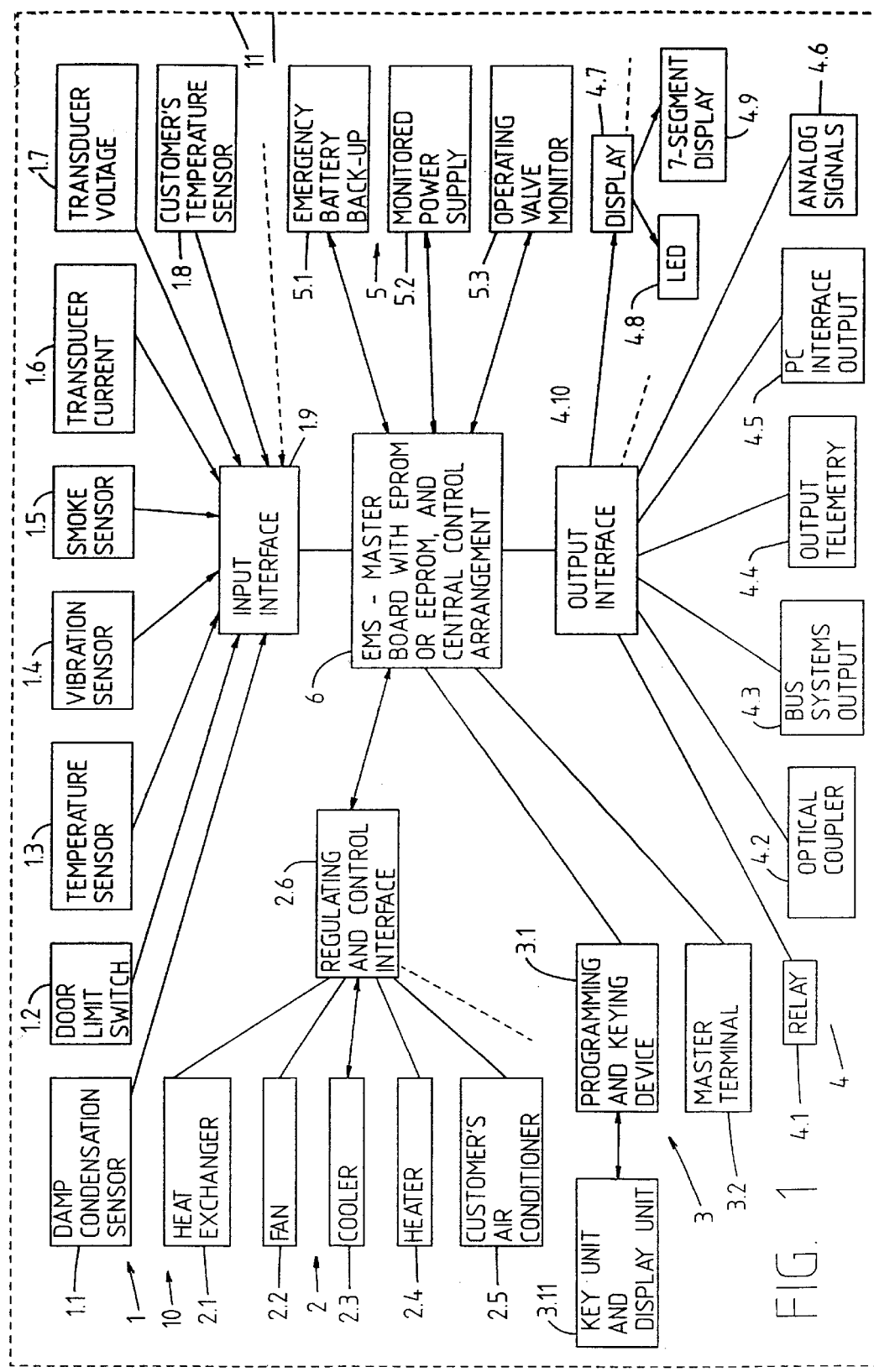

ENERGY MANAGEMENT SYSTEM WITH ARRANGEMENT TO MONITOR AND CONTROL HEATING, VENTILATING AND AIR CONDITIONING COMPONENTS

RELATED APPLICATIONS AND CLAIM PRIORITY

This application is a 371 National Stage of PCT Application No. PCT/EP97/00660 having an international filing date of Feb. 13, 1997, which designates at least one country in addition to the United States and which claims priority from German Application No. 196 09 689.8 filed Mar. 13, 1996. For priority purposes, this application claims the benefit of 35 USC 371 and/or 35 USC 120.

RELATED APPLICATION

This application claims priority for German application no. DE 19961009689, now German patent No. DE 19609608, filed on Mar. 13, 1996.

1. Field of Invention

The invention relates generally to heat exchange and, more particularly, to heating and cooling within an enclosed cabinet.

2. Background of the Invention

Switch cabinets are known in the art such as the one disclosed in DE 33 26 977 C2 where a unit that is built in or added on, for example in the form of an air conditioner subassembly, is monitored and controlled and regulated. In such a switch cabinet, however, the air conditioning can only be regulated globally for the entire cabinet volume. In such switch cabinet, adjustment relating to specific requirements, not only for the air conditioning but also for other functions of the switch cabinet, are not possible.

A switch cabinet having an arrangement that would allow for the monitoring and control of built in and added components such as an air conditioner would be an important improvement in the art.

OBJECTS OF THE INVENTION

An object of the invention is to provide a switch cabinet that overcomes some of the problems and shortcomings of the prior art.

Another object of the invention is to provide a simple design for a switch cabinet that offers a number of possibilities with regard to monitoring and control under various conditions of application. How these and other objects are accomplished will become apparent from the following descriptions and from the drawings.

SUMMARY OF THE INVENTION

The invention involves a switch cabinet that is equipped with a central control device that can be connect to monitoring and/or control arrangements through predetermined inputs and outputs that allow for the monitoring, control and/or regulation of various built in and/or added components.

According to the invention, the information from and to various monitoring and control subassemblies is brought together, processed and acted upon in a central control device. This allows the conditions of the various built in and/or added components to be individually and interdependently determined, given the current conditions of application. In this way the switch cabinet can be adapted to very different requirements inside as well as outside, whereby the desired conditions can be reliably monitored.

Specifically, it is provided that the monitoring components feature a sensor device with, depending on need, at least a humidity sensor, a door end switch, a temperature gauge, a vibration sensor, a smoke detector, a current transducer, a voltage transducer and/or a customer temperature sensor. Such monitoring components allow different types of information with regard to varying operating conditions and safety measures to be collected and evaluated. The signal transfer and processing is carried out in a simple manner in that the sensing arrangement is connected bidirectionally with the central control device through an input interface.

The operating reliability of the entire monitoring system is improved as a result of measures where the monitoring components feature function monitoring that includes a voltage supply device and operating value monitoring that allows for a switch over to an emergency power if the normal power supply is interrupted. Such switch over results in programmed emergency functions being appropriately maintain and the central control device separately buffered.

The air conditioning system is organized in a simple manner and visually arranged for clarity with regard to control and regulation. Measures are taken such that the control subassemblies feature a regulating and control interface that is bidirectionally connected to both the central control arrangement and to an air conditioning device. Such air conditioning device includes, depending on requirements, at least a heat exchanger, a fan, a cooling device, a heater and/or a customer fan such that the signals required for the regulation and control can be generated in the regulation and control interface, and the air conditioning device can be controlled by corresponding signals from the central control device.

An overview of the operating status and the ability to control it through the corresponding output devices are provided in that the control components feature an output interface that is bidirectionally connected to both the central control unit and to an output device. Such output device features, as required, at least a relay, an optical coupler, a bus system output, a telemetry output, a PC interface output, an analog signal output, a display device, an LED display and/or a symbol display unit with symbol display elements. Signals generated from the central control device can be transduced in the output interface to actuate the output device.

If it is provided that a programming and keying unit and/or a master terminal are bidirectionally connected to the central control device such that test procedures held in permanent memory can be called up using the programming and keying device and certain parts of programs can be changed and/or customer specific reference values can be entered, then function testing and changes in the set parameters, such as temperature set point values, can be undertaken at any time and in a simple manner. In this way adjustment with regard to changed conditions is also readily possible.

The invention is explained in more detail in the following on the basis of exemplified embodiments with reference to the drawing.

BRIEF DESCRIPTION OF THE DRAWINGS

FIG. 1 is a schematic diagram showing the relationship of the monitoring and control modules to the central control device.

DETAILED DESCRIPTION OF THE PREFERRED EMBODIMENTS

FIG. 1 shows an entire monitoring arrangement 10, certain components of which are housed in a switch cabinet 11.

The arrangement 10 includes a sensor device 1, an air conditioning device 2, a communications device 3, and output device 4, function monitoring 5 as well as a central control device 6. The sensor device 1 is connected to the central control device 6 through an input interface 1.9, whereby the connection between the input interface 1.9 and the central control device 6 is designed so as to be bidirectional.

The sensor device 1 includes a humidity sensor 1.1, a door switch 1.2, a temperature gauge 1.3, a vibration sensor 1.4, a smoke detector 1.5, a current converter and transducer 1.6, a voltage transducer 1.7 and a customer temperature gauge 1.8. These individual components of the sensor arrangement 1 are indicated by way of examples and may, in part, also be absent or be provided multiple times, depending on the conditions of application and customer requirements. To accomplish this, the design can be such that exchange or supplementation are readily possible.

The input interface 1.9 is advantageously constructed on a mother circuit board thereby providing a voltage supply for the sensor device 1 that corresponds to the requirements of the individual components such that DC and AC voltages are available, and processing the signals provided by the individual components of the sensor device 1 and converting them such that they can be transferred to the central control device 6. Additionally, evaluation and weighing of the signals as well as a logical link can be carried out.

The air conditioning device 2 according to the exemplified embodiment features a heat exchanger 2.1, a fan 2.2, a cooling device 2.3, a heater 2.4, a customer fan 2.5 and a regulating and control interface 2.6. The regulating and control interface 2.6 is bidirectionally connected to both the central control device 6 and to the indicated components of the air conditioning device 2.

The connected components of the air conditioning system are controlled with the help of a regulating and control interface 2.6 corresponding to the signals from the central control device 6. As a consequence of the bidirectional connection there also exists, in addition to control or regulation, an ability to monitor the functioning of the air conditioning device 2 with its individual components. All signals required for control can be self generated in the regulation and control interface 2.6, such that the connection to the central control device 6 is simple and provides clear visual overview.

Fan 2.2 and customer fan 2.5 can be AC or DC types. The air conditioner arrangement 2 advantageously also includes compressors, pneumatic or hydraulic valves, humidifying and dehumidifying devices, pressure sensors and air flow monitoring devices. The individual components of the air conditioning device 2 can be provided according to preference, and can be controlled and regulated.

The communication arrangement 3 includes a programming and keying device 3.1 as well as a master terminal 3.2. The programming and keying device 3.1 can, for example, be operated with a (non illustrated) hand module. Test programs in permanent memory can be called up, and specific program parts can be changed (e.g., subsequent changes in temperature set point values) by means of the programming and keying device 3.1. Furthermore, reference values (e.g., for calibration) can be entered. Operating conditions can be checked through the master terminal 3.2 and, if need be, adjusted.

The output arrangement 4 includes a relay 4.1, an optical coupler 4.2, a system output 4.3, a telemetry output 4.4, a PC interface output 4.5, an analog signal output 4.6, a display device 4.7, an LED 4.8, a symbol display unit with symbol display elements 4.9 as well as an output interface 4.10. The output interface 4.10 bidirectionally connects to the central control device 6.

Information signals in forms that are as varied as recognition by the most varied components permits can be output with the help of the output interface 4.10. For example, data can be transferred to a remote monitoring station by means of telemetry output 4.4. External signaling devices can be actuated, for example, by means of relay 4.1 or by means of optical coupler 4.2, providing information, for example, relating to a functional error or unauthorized access.

The bus system output 4.3 can include, e.g., a field bus or the like. The PC interface output 4.5 can, for example, be designed as an RS 232 interface or the like. As the display device 4.7, any suitable display devices, for example liquid crystal display (LCD) units or the like, can also be provided. The analog signal output 4.6 can be designed as a voltage or current output.

Function monitoring includes an emergency power supply 5.1, a regular power supply 5.2 as well as operational monitoring 5.3. The emergency power supply 5.1 can, for example, be a battery buffered voltage supply for the entire monitoring device 10, which in the event of a loss of power maintains certain programmed emergency functions. The regular power supply 5.2, in particular the mains voltage supply, is always monitored in order to switch directly to the emergency supply 5.1 in case of emergency. The central control device 6, which is advantageously constructed on a mother circuit board, is again individually buffered.

The operating value monitoring 5.3 serves as a memory for recording operating data (running time, for example) as well as for error storage for errors that arise during operation or problems that have corrected themselves.

Aside from the indicated, exemplified individual components, more or other components can be provided along with the various devices in the overall monitoring device 10 to any extent that is expedient. The connection to the respective interface or the central control device 6 is easily possible and adaptation by means of appropriate, simple reprogramming of the central control device 6 is also easy to carry out.

The control device 6 constructed on the mother circuit board is based, e.g., on an 8 bit microcontroller system. The overall monitoring arrangement 10, using memory building blocks, for example an EPROM or EEPROM, is capable of linking all inputs and outputs in any desired manner so that very different types of adaptation are possible without expensive structural changes.

As used in this specification, the term "bidirectionally" means that electrical communications, using digital and/or analog signals, are capable of being carried out in two directions. For example, the input interface 1.9 is configured to send signals to the central control device 6 of the energy management system (EMS) and the device 6 is configured to send signals to the interface 1.9.

While the principles of the invention have been shown and described in connection with specific embodiments, it is to be understood clearly that such embodiments are by way of example and are not limiting.

What is claimed is:

1. An energy management system comprising system components and controller components in a mounting cabinet wherein the controller components comprise:

an input interface connected to a central control arrangement;

a regulating and control interface connected to the central control arrangement;

an output interface connected to the central control arrangement a relay, a bus systems output and a PC interface output connected to the output interface; and normal and back-up power supplies connected directly to the central control arrangement and providing necessary power to the controller components;

and wherein the system components comprise:

an air conditioning device comprising at least a fan, a cooler and a heater connected to the central control arrangement through the regulating and control interface; and a sensing device comprising a temperature sensor and a smoke sensor connected to the central control arrangement through the input interface.

2. The energy management system of claim 1 wherein the controller components further include an operating value monitor connected directly to the central control arrangement.

3. The energy management system of claim 2 wherein the systems components further include a vibration sensor.

4. The energy management system of claim 1 wherein the input interface, the regulating and control interface and the output interface are bidirectionally connected to the central control arrangement.

5. The energy management system of claim 1 wherein the signals required for regulation and control of the air conditioner are generated in the regulating and control interface.

6. The energy management system of claim 1 wherein:

the air conditioning device further includes a heat exchanger a customized fan;

the signals required for regulation and control of the air conditioning device can be generated in the regulating and control interface; and the air conditioner device can also be controlled corresponding to signals from the central control arrangement.

7. The energy management system of claim 1 further including an optical coupler, a telemetry output and an analog signal output connected to the output interface.

8. The energy management system of claim 1 wherein:

a programming and keying device and a master terminal are bidirectionally connected to the central control arrangement;

test procedures permanently stored in memory can be called up by means of the programming and keying device; and certain parts of programs can be changed and customer specific reference values can be entered.

* * * * *